May 23, 1933.   P. J. H. A. NORDLOHNE   1,910,040
PUSHPULL AMPLIFIER
Filed June 8, 1931
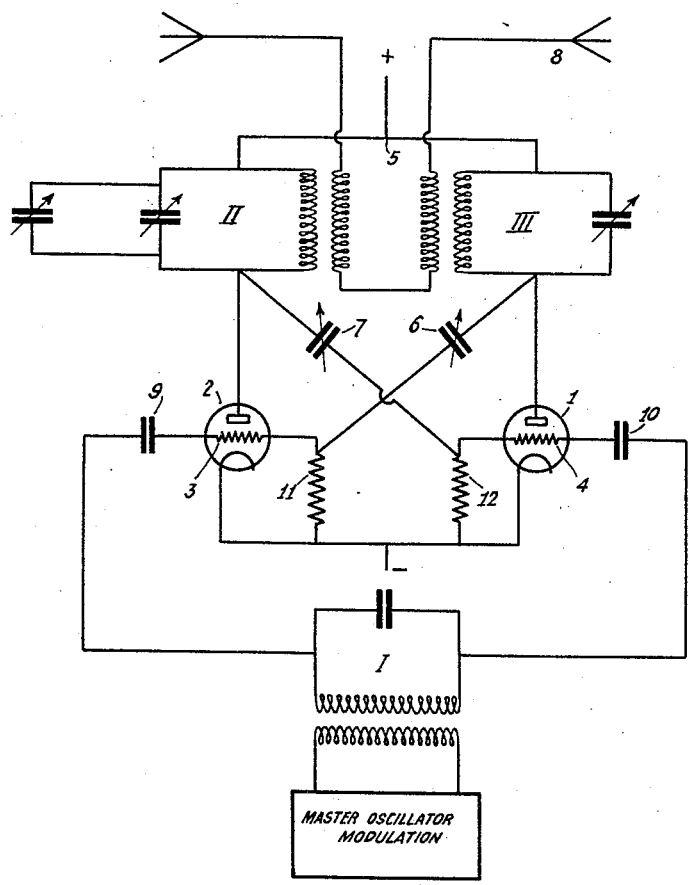
INVENTOR
PIERRE JANNE HENRI ALPHONSE NORDLOHNE
BY
ATTORNEY Patented May 23, 1933

1,910,040

UNITED STATES PATENT OFFICE

PIERRE JANNE HENRI ALPHONSE NORDLOHNE, OF EINDHOVEN, NETHERLANDS, ASSIGNOR TO RADIO CORPORATION OF AMERICA, A CORPORATION OF DELAWARE

PUSHPULL AMPLIFIER

Application filed June 8, 1931, Serial No. 542,751, and in the Netherlands June 7, 1930.

(GRANTED UNDER SECTION 14, ACT OF MARCH 2, 1927, 357 O. G. 5)

This invention relates to improvements in pushpull connected generators or amplifiers.

In the normal circuit arrangement of pushpull generators or amplifiers the grids or control electrodes of the two pushpull connected electron discharge devices triodes are energized in counter-phase and the amplified currents occur in one common output circuit. This output circuit is coupled to an aerial or to a surface main.

The advantage of these pushpull generators and amplifiers resides in the symmetry of the circuit arrangement which renders action more stable.

According to the present invention, in a circuit arrangement of this kind use is not made of one common output circuit, as hitherto has been common practice, but the output circuit is separated into two output circuits which are so coupled to a consumption circuit, for example an aerial, that the voltages therein induced are in phase with each other. It has been found that the use of separate output circuits for the two pushpull connected tubes has, over the ordinary pushpull circuit arrangement, the advantage of enhancing output energy and efficiency.

All the advantages of the pushpull circuit arrangement, such as the symmetry of the circuit arrangement, the use of a single source of voltage can be conserved, according to this invention.

If it is desired to neutralize the circuit arrangement the grids and the plates or anodes are connected crosswise by condensers.

Either of the anode circuits may be rendered tunable by means of an adjustable condenser. In this case the arrangement is preferably such that the movable electrodes are connected to a point of constant potential, for example the positive pole of the source of high voltage.

The advantage of the circuit arrangement described is considerable, particularly in connection with high frequencies.

The circuit arrangement may be interpreted in general as a circuit arrangement of two triodes either of which is provided with an output circuit and having their grids supplied with alternating voltages having a phase difference of 180 degrees. In this arrangement it is not essential that, as in the case of the ordinary pushpull connection, the two tubes should be supplied from a single source of plate current. Preferably, however, a circuit arrangement is used which is corresponding with the normal pushpull connection.

In order that the invention may be clearly understood and readily carried into effect one example of the circuit arrangement according to the invention will be described more fully with reference to the accompanying drawing.

Referring to the figure, 1 and 2 designate two triodes the grids 3 and 4 of which are energized in counter-phase by the circuit I.

The anodes of the tubes are interconnected through tuned circuits II and III and the point of connection or of these circuits is connected, for example, through a choke coil not shown, to the positive pole of the source of high tension.

The anode of 1 is connected to the grid 2 through a neutralizing condenser 6 and the anode 2 is connected to the grid of 1 by a condenser 7.

The circuits II and III are coupled by induction to a consumption conductor, for example an aerial 8, the arrangement being such that the voltages induced in 8 by the two circuits are in phase.

9 and 10 designate grid condensers and 11 and 12 leak resistances.

I claim:

Means for relaying high frequency oscillations comprising a pair of thermionic tubes, means for impressing high frequency oscillations in phase opposition on the control electrode thereof, a load circuit comprising two spaced lumped inductances, means for connecting said inductances in series comprising a connection between two adjacent terminals of said inductances, and means for efficiently impressing the oscillations repeated in said thermionic tubes in phase on said load circuit comprising a pair of lumped inductances, each of said last named inductances being coupled to one of said first named inductances only, a connection between the terminal of each of said last named inductances adjacent the connection between said first named spaced inductances and the anode electrode in one of said tubes, means for connecting the free terminals of said last named pair of inductances together and to a common source of potential, tuning means connected with each of said last named lumped inductances, and means for neutralizing the internal capacity effects of said tubes.

PIERRE JANNE HENRI ALPHONSE NORDLOHNE.